(12) United States Patent
Hu

(10) Patent No.: US 9,667,759 B2
(45) Date of Patent: May 30, 2017

(54) MOBILE NETWORK STRUCTURE

(71) Applicant: Ta-Wei Hu, Taipei (TW)

(72) Inventor: Ta-Wei Hu, Taipei (TW)

(*) Notice: Subject to any disclaimer, the term of this patent is extended or adjusted under 35 U.S.C. 154(b) by 0 days.

(21) Appl. No.: 14/995,292

(22) Filed: Jan. 14, 2016

(65) Prior Publication Data
US 2017/0099373 A1 Apr. 6, 2017

(30) Foreign Application Priority Data
Oct. 2, 2015 (TW) .............................. 104215905 U

(51) Int. Cl.
*H04M 1/00* (2006.01)
*H04M 1/02* (2006.01)
*H02J 7/00* (2006.01)
*H04W 88/06* (2009.01)

(52) U.S. Cl.
CPC ......... *H04M 1/0202* (2013.01); *H02J 7/0045* (2013.01); *H04W 88/06* (2013.01)

(58) Field of Classification Search
USPC .................... 455/558, 550.1, 552.1, 575.1
See application file for complete search history.

(56) References Cited

U.S. PATENT DOCUMENTS

| | | | |
|---|---|---|---|
| 2014/0011490 A1* | 1/2014 | Ricket | H04W 88/06 455/418 |
| 2015/0327146 A1* | 11/2015 | Baluja | G06Q 30/0601 455/435.2 |
| 2015/0363066 A1* | 12/2015 | Lemay | G06F 3/0488 345/173 |

* cited by examiner

*Primary Examiner* — Fayyaz Alam
(74) *Attorney, Agent, or Firm* — Jackson IPG PLLC; Demian K. Jackson

(57) ABSTRACT

A mobile network structure comprises a processor; a communications unit, connected to the processor, comprising a first communications interface, a second communications interface, and a third communications interface; an operation unit, connected to the processor; at least a SIM card slot, connected to the processor; and a power unit, connected to the processor. As such, the communications unit is used to get connected with a local communications provider, so that a mobile electronic device of a user may be used for net-surfing through the communications unit, to achieve the efficacies of a reduced use cost, a use convenience and an efficient guaranteed information safety.

8 Claims, 4 Drawing Sheets

MOBILE NETWORK STRUCTURE

The present invention is related to a mobile network, and particularly to such structure where a communications unit is used to get connected with a local communications provider, so that a mobile electronic device of a user may be used for net-surfing through the communications unit, to achieve the efficacies of a reduced use cost, a use convenience and an efficient guaranteed information safety.

DESCRIPTION OF THE RELATED ART

Generally, when a user desires to go net-surfing by using a mobile electronic device, such as a notebook computer, a tablet computer at other countries, he/she has to acquire an international roam service through a domestic communications provider, or a local free wi-fi source for this purpose.

However, since the international roam service charges higher, the required cost for the users requiring a higher use load and a longer use time. Regarding the locally used free wi-fi, the supervision may become an issue since the mobile electronic device may likely be invaded by some hackers. This may result in that the ID, password or some important information of the user may be easily stolen, bringing about an information safety issue.

Therefore, the inventor of the present invention sets forth a mobile network structure to effectively improve the demerit of the prior art.

SUMMARY OF THE INVENTION

It is, therefore, an object of the present invention to provide a mobile network where a communications unit is used to get connected with a local communications provider, so that a mobile electronic device of a user may be used for net-surfing through the communications unit, to achieve the efficacies of a reduced use cost, a use convenience and an efficient guaranteed information safety.

According to the present invention, the mobile network structure comprises a processor; a communications unit, connected to the processor, comprising a first communications interface, a second communications interface, and a third communications interface; an operation unit, connected to the processor; at least a SIM card slot, connected to the processor; and a power unit, connected to the processor.

In an embodiment, the processor, the communications unit, the operation unit, the SIM card slot and the power unit are combined with a case, respectively, the processor, the communications unit and the power unit are disposed within the case, while the operation unit and the SIM card slot are disposed outside the case.

In an embodiment, the processor is a single chip or the first communications interface is a machine to machine data swap interface.

In an embodiment, the second communications interface is a virtual 4G mobile wide band transmission interface.

In an embodiment, the third communications interface is a wi-fi communications interface.

In an embodiment, the operation unit comprises a display disposed above a face of the case, a switch key disposed at a side edge of the case, and a reset key disposed at the side edge of the case.

In an embodiment, the power unit is a charging battery and connected to a charging slot disposed at the side edge of the case.

In an embodiment, the processor is further connected to a memory card slot.

BRIEF DESCRIPTIONS OF THE DRAWINGS

The present invention will be better understood from the following detailed descriptions of the preferred embodiments according to the present invention, taken in conjunction with the accompanying drawings, in which.

DESCRIPTION OF THE PREFERRED EMBODIMENTS

Figure 1:
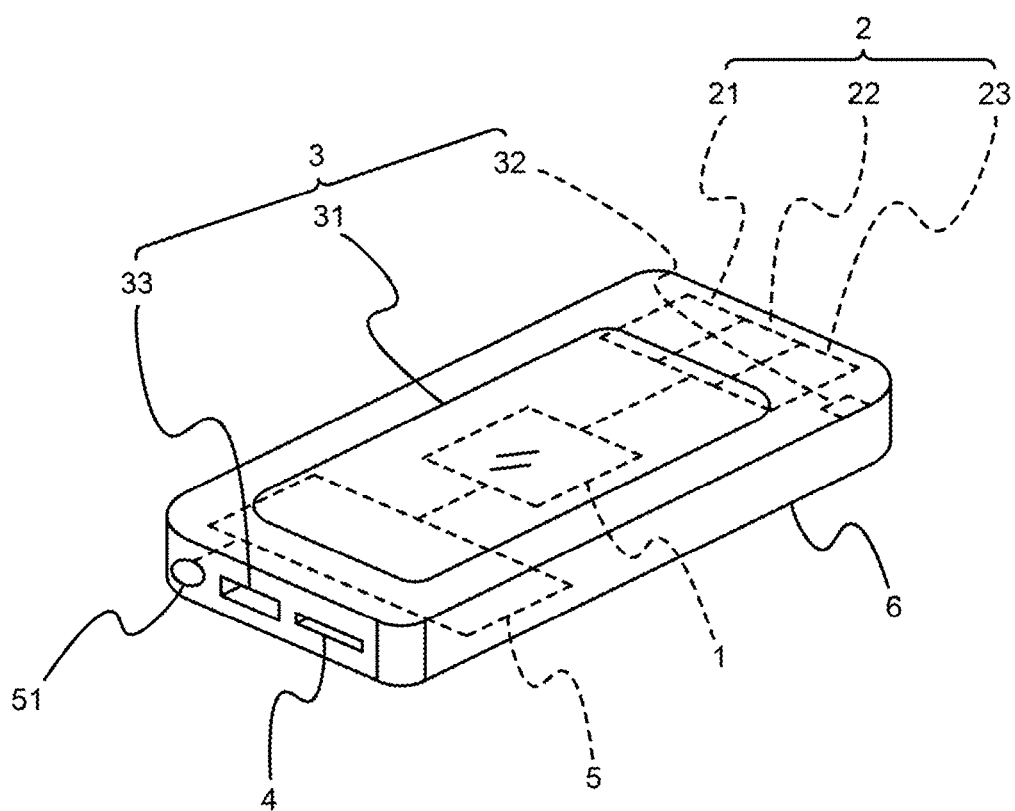
FIG. 1 is a schematic diagram of a basic architecture according to the present invention.
Figure 2:
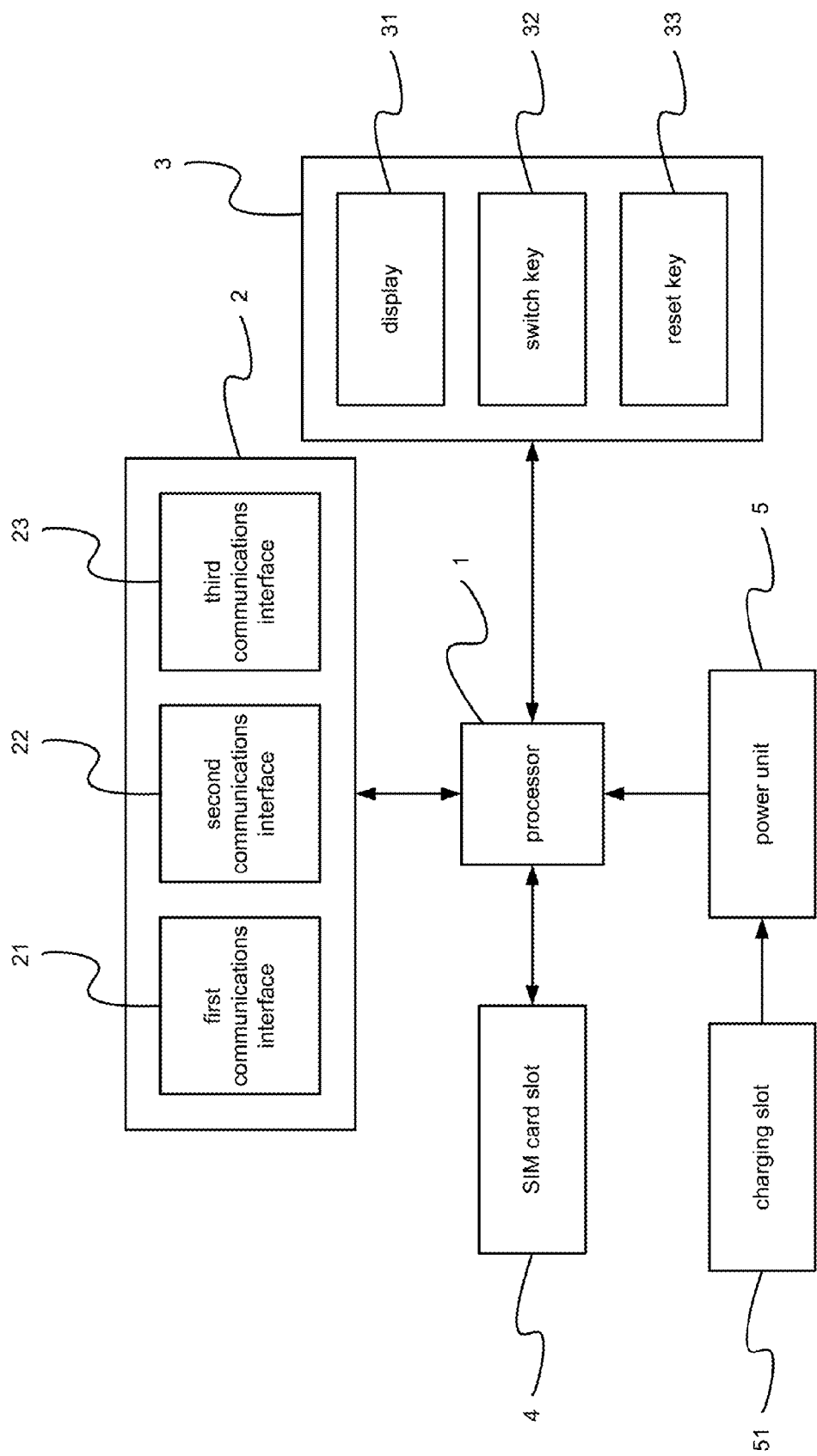
FIG. 2 is a schematic block diagram of the present invention.
Figure 3:
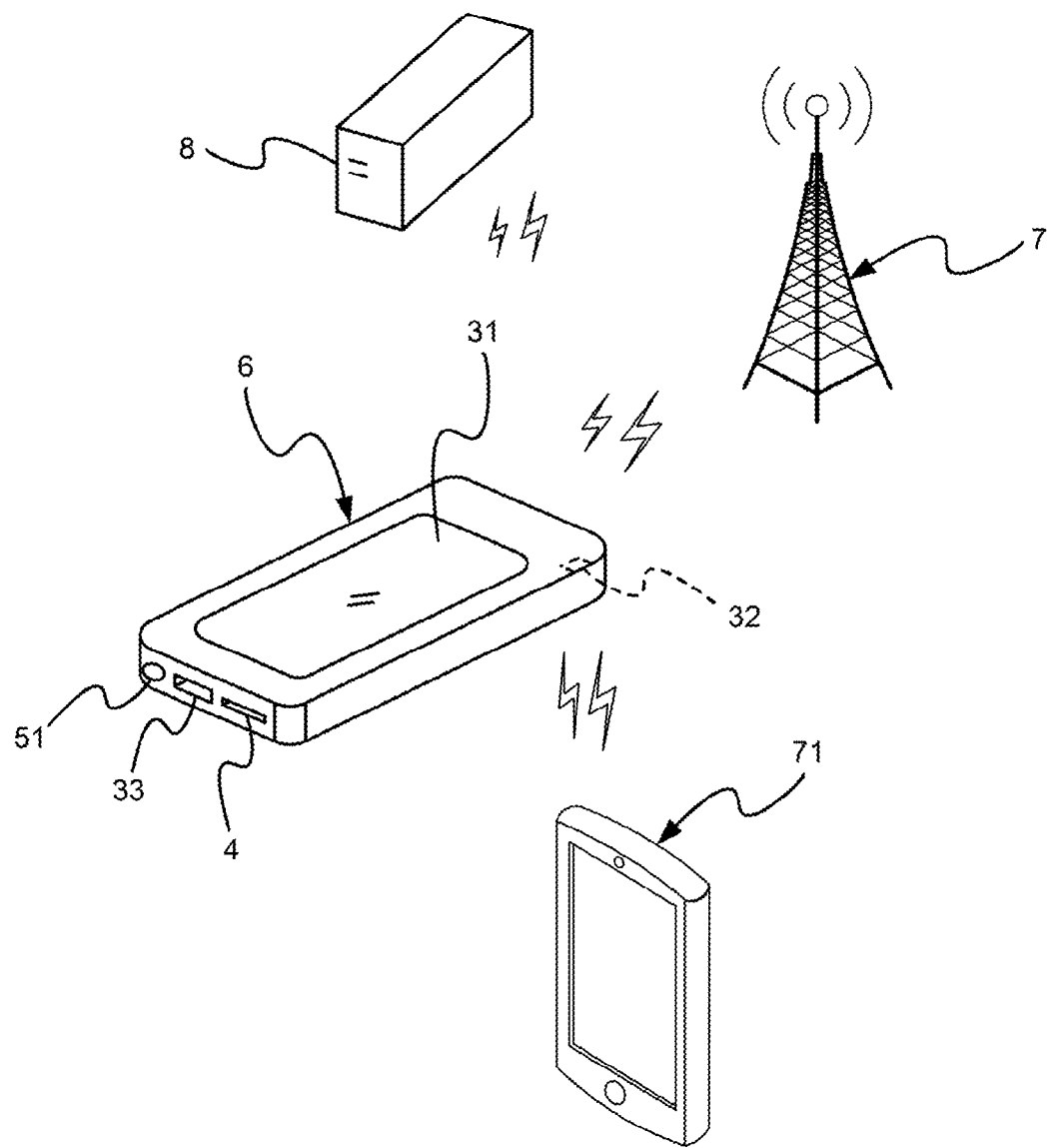
FIG. 3 is a schematic diagram of a use state according to the present invention.
Figure 4:
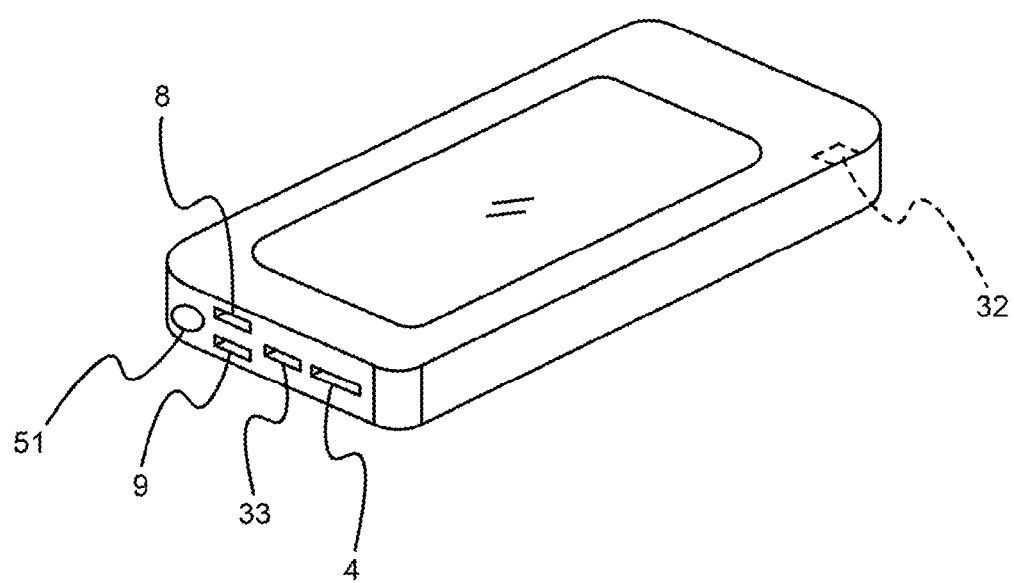
FIG. 4 is a schematic diagram of another embodiment of the present invention.

Referring to FIG. 1, a schematic diagram of a basic architecture according to the present invention, FIG. 2 is a schematic block diagram of the present invention, FIG. 3 is a schematic diagram of a use state according to the present invention, and FIG. 4 is a schematic diagram of another embodiment of the present invention.

As shown, the present invention is a mobile network structure, comprising a processor 1, a communications unit 2, an operation unit 3, at least 1 SIM card slot 4 and a power unit 5. The processor 1, the communications unit 2, the operation unit 3, the SIM card slot 4, and the power unit 5 are combined within the case 6. The operation unit 3 and the SIM card slot 4 are disposed at exterior side of the case 6. The processor 1 is a single chip or a logic circuit and used as a control center when the communications unit 2, the operation unit 3, the SIM card slot 4 and the power unit 5 are used.

The communications unit 2 is connected to the processor 1 and includes a first communications interface 21, a second communications unit 22 and a third communications interface 23. The first communications unit 21 is a machine to machine data swap interface. The second communications interface 22 is a virtual 4G mobile wide band transmission interface. The third communications interface 23 is a wi-fi communications interface.

The operation unit 3 is connected to the processor 1.

The operation unit 3 includes a display 31 on a face of the case 6, a switch key 32 disposed at a side edge of the case 6, and a rest key 33 disposed at a side edge of the case 6.

The SIM card slot 4 is connected to the processor 1.

The power unit 5 is connected to the processor 2. The power unit 5 is a charging slot 51 disposed at the side edge of the case 6. The charging slot 51 is used together with a charger (not shown) to acquire an external power to charge the power unit 5. As such, the above structure constitutes a mobile network structure.

When the user operates the present invention, a local SIM card at the country where the mobile electronic device is located may be inserted into the second communications interface 22. Then, the switch key 32 of the operation unit 3 is pressed. In this manner, the communications unit 2 is enabled to connect to a plant server 8 through the first communications interface 21, so that the plant server 8 receives and determines a client information of the user to the mobile communications device. Upon an ID of the user being ascertained, the second communications interface 22 and the local communications provider 7 are enabled to get connected. After the second communications interface 22 is established with its connection, the first communications interface 21 is closed, only the second communications interface 22 is retained for its connection, constituting a mobile network. As such, the mobile electronic device 71, such as a notebook computer, a tablet computer and a mobile phone, of the user may handshake with the third communications interface 23 and may be used for net-surfing through the second communications interface 22. In this manner, the users may do without the international roam when the user surfs the Internet at the other countries. At the same time, there is no need to directly use the mobile electronic device 71 as a hot spot for net-surfing for other devices.

As such, the efficacies of a reduced use cost, a use convenience and an effective guaranteed information safety.

In addition, the SIM card slot 4 is inserted with a local SIM, so that the user may freely select the required communications provider according to his use habit, signal acceptance condition, or some discount activities. In this manner, the present invention may satisfy with the actual use.

In use, the display 31 of the operation unit 3 is used to display a use state, such as an electricity amount, and a connection state. When a connection occurs in use, the reset key 33 may be pressed to re-activate a connection. Further, when the present invention is physically used, there is a total amount limit. For example, in the case that only two hundred sets of devices are provided at some country, the user may be informed the remaining amount when buying. When two hundred sets are all sold out, no more other devices are provided any more. In this manner, a use quality may be maintained and the resource may be effectively employed.

In addition, the processor 1 may be further connected with the memory card slot 8, so that the user may be benefited with some associated extension uses (e.g. the ones shown in FIG. 4).

In view of the above, the mobile network structure of the present invention may effectively overcome the demerits encountered in the prior art. The communications unit is used to get connected with the local communications provider, so that the mobile electronic device of the user may be used for net-surfing through the communications unit, to achieve the efficacies of a reduced use cost, a use convenience and an efficient guaranteed information safety.

From all these views, the present invention may be deemed as being more effective, practical, useful for the consumer's demand, and thus may meet with the requirements for a patent.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the claims.

What is claimed is:

1. A mobile network structure, comprising:
a case;
a processor disposed inside the case;
a memory card slot disposed inside of the case and connected to the processor;
a communications unit, disposed inside the case and connected to the processor and comprising a first, a second, and a third communications interfaces;
an operation unit disposed inside the case and connected to the processor;
at least a SIM card slot, disposed inside the case and extending to an exterior side of the case and connected to the processor; and
a power unit, disposed inside the case and connected to the processor, wherein the first communications interface establishes communications with a plant server to communicate client information of a user and wherein the second communications interface then connects with a local communications provider and the first communications interface communication with the plant server is then terminated and wherein a mobile electronic device handshakes with the third communications interface such that the user of the mobile electronic device can net-surf via the second communications interface.

2. The mobile network structure as claimed in claim 1, wherein the processor is a single chip or a logic circuit.

3. The mobile network structure as claimed in claim 1, wherein the first communications interface is a machine to machine data swap interface.

4. The mobile network structure as claimed in claim 1, wherein the second communications interface is a virtual 4G mobile wide band transmission interface.

5. The mobile network structure as claimed in claim 1, wherein the third communications interface is a Wi-Fi communications interface.

6. The mobile network structure as claimed in claim 1, wherein the operation unit comprises a display disposed on a face of the case, a switch key disposed at a side edge of the case, and a reset key disposed at the side edge of the case.

7. The mobile network structure as claimed in claim 1, wherein the power unit includes a rechargeable battery connected to a charging slot disposed at a side edge of the case.

8. The mobile network structure of claim 1, wherein the second communications interface connects with the local communications provider based on a local SIM card inserted into the at least one SIM card slot.

* * * * *